United States Patent
Bispo et al.

(10) Patent No.: US 11,914,986 B2
(45) Date of Patent: Feb. 27, 2024

(54) API GATEWAY SELF PACED MIGRATION

(71) Applicant: salesforce.com, inc., San Francisco, CA (US)

(72) Inventors: Mariano De Sousa Bispo, Buenos Aires (AR); Federico Balbi, Buenos Aires (AR)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/589,708

(22) Filed: Jan. 31, 2022

(65) Prior Publication Data

US 2023/0101447 A1 Mar. 30, 2023

Related U.S. Application Data

(60) Provisional application No. 63/246,137, filed on Sep. 20, 2021.

(51) Int. Cl.
| | |
|---|---|
| *G06F 9/54* | (2006.01) |
| *G06F 8/10* | (2018.01) |
| *G06F 8/36* | (2018.01) |
| *G06F 8/41* | (2018.01) |
| *G06F 8/65* | (2018.01) |
| *G06F 8/71* | (2018.01) |

(Continued)

(52) U.S. Cl.
CPC .............. *G06F 8/65* (2013.01); *G06F 8/10* (2013.01); *G06F 8/36* (2013.01); *G06F 8/423* (2013.01); *G06F 8/457* (2013.01); *G06F 8/71* (2013.01); *G06F 9/547* (2013.01); *G06F 21/6218* (2013.01); *H04L 63/029* (2013.01); *H04L 63/1458* (2013.01); *H04L 63/20* (2013.01)

(58) Field of Classification Search
CPC ........... G06F 9/541; G06F 9/547; H04L 67/40
See application file for complete search history.

(56) References Cited

U.S. PATENT DOCUMENTS

| | | | |
|---|---|---|---|
| 7,996,499 B2 * | 8/2011 | Lev | H04L 67/02 709/224 |
| 9,338,064 B2 | 5/2016 | Stratton et al. | |
| 10,437,712 B1 | 10/2019 | Tyler et al. | |

(Continued)

OTHER PUBLICATIONS

Hai Le Gia, "The Great API Migration" (Jul. 8, 2020), pp. 1-12 [retrieved from https://medium.com/fsmk-engineering/the-great-api-gateway-migration-b8e32a9843b4]. (Year: 2020).*

(Continued)

*Primary Examiner* — Brian W Wathen
(74) *Attorney, Agent, or Firm* — Sterne, Kessler, Goldstein & Fox P.L.L.C.

(57) ABSTRACT

Disclosed herein are system, method, and computer program product embodiments for self-paced migration of an application programming language (API) gateway. An embodiment operates by applying a policy chain comprising a first set of policies to an API request received at a first API gateway. The embodiment forwards the API request to a second API gateway and applies, at the second gateway, a virtual policy chain comprising a second set of policies to the API request. The embodiment then forwards the API request to the first API gateway and routes the API request to a corresponding backend API.

20 Claims, 4 Drawing Sheets

(51) Int. Cl.
    *G06F 21/62*         (2013.01)
    *H04L 9/40*          (2022.01)

(56) References Cited

U.S. PATENT DOCUMENTS

| | | |
|---|---|---|
| 11,150,874 B2 | 10/2021 | Lester et al. |
| 11,228,573 B1 | 1/2022 | Rangasamy et al. |
| 2007/0083874 A1* | 4/2007 | Vasudevan ................ G06F 8/65 719/328 |
| 2016/0092344 A1 | 3/2016 | Bally et al. |
| 2017/0102976 A1 | 4/2017 | Nandakumar et al. |
| 2017/0104641 A1 | 4/2017 | Bradshaw et al. |
| 2018/0098131 A1 | 4/2018 | Zhou |
| 2018/0217871 A1 | 8/2018 | Doshi et al. |
| 2020/0104404 A1* | 4/2020 | Li ......................... G06F 9/5055 |
| 2021/0036925 A1* | 2/2021 | Boddam ............. H04L 41/5054 |
| 2021/0089291 A1 | 3/2021 | Evans et al. |
| 2022/0035689 A1* | 2/2022 | Raheja .................. G06F 9/5011 |
| 2022/0066848 A1* | 3/2022 | Cho .................... H04L 41/0893 |
| 2022/0182439 A1 | 6/2022 | Zhu et al. |
| 2023/0085848 A1 | 3/2023 | Esteben et al. |
| 2023/0086783 A1 | 3/2023 | Bruno et al. |
| 2023/0088768 A1 | 3/2023 | Bispo et al. |
| 2023/0090079 A1 | 3/2023 | Bruno et al. |
| 2023/0092752 A1 | 3/2023 | Balbi et al. |
| 2023/0093304 A1 | 3/2023 | Brasburg et al. |

OTHER PUBLICATIONS

Rahul, "API Gateway using Envoy and Docker" (Sep. 18, 2020), pp. 1-40 [retrieved from https://myview.rahulnivi.net/api-gateway-envoy-docker/]. (Year: 2020).*

* cited by examiner

API GATEWAY SELF PACED MIGRATION

CROSS-REFERENCE TO RELATED APPLICATIONS

This application claims the benefit of U.S. Provisional Patent Application No. 63/246,137 by Bispo, et al., titled "Enterprise Management Functionality in an Application Programming Interface Gateway," filed on Sep. 20, 2021, which is incorporated by reference herein in its entirety.

BACKGROUND

One or more implementations relate to the field of Application Programming Interfaces (APIs), and more specifically, to API gateway migration.

As connectivity between computer and mobile devices continues to develop, applications have been developed that communicate and share information. Commonly, applications may communicate via an Application Programming Interface (API). An API is a software interface offering a service to other programs to communicate data. APIs may have several different components, such as specifications, markdown documents, etc., that constitute part of an API's development.

An API gateway is an API management tool that sits between an API endpoint and backend services, transmitting client requests to an appropriate service of an application. A company may desire to upgrade its existing API gateways to meet growing business demands. Upgrading an API gateway may involve migrating several API policies from an existing API gateway to a new API gateway. Furthermore, migrating custom API policies may require a customer to invest substantial time and resources. Accordingly, what is needed is a simplified solution for API gateway migration.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing self-paced migration of API gateway policies.

In some embodiments, an API gateway enforces various polices when processing an API request. An API policy may be a set of rules that are enforced by the API Gateway. Also, there can be multiple types of API policies. In some embodiments, some API policies may allow or block access to APIs based on an IP address of the client application, while others may allow or restrict access to specific resources provided by an API. Some APIs may enable controlling the rate at which requests are made to a backend API. Further, an API policy may be an out-of-the-box policy defined by an API gateway provider or a custom policy defined by a client using the API gateway.

To meet business demands, a user may desire to upgrade an existing API gateway to a new API gateway with improved capabilities. Upgrading an API gateway may involve migrating policies from a legacy API gateway to a new API gateway. API gateway migration may be performed in a single operation at a single point in time. However, that may result in operational interruptions. In some embodiments, self-paced API gateway migration may involve incremental and selective migration of policies to a new API gateway, rather than migrating all policies in a single operation. In some embodiments, a self-paced migration may allow customers to specify a migration timeline. An incremental self-paced API gateway migration may provide an advantage of minimizing or eliminating system downtime and operational interruptions.

Various embodiments of these features will now be discussed with respect to the corresponding figures.

Figure 1:
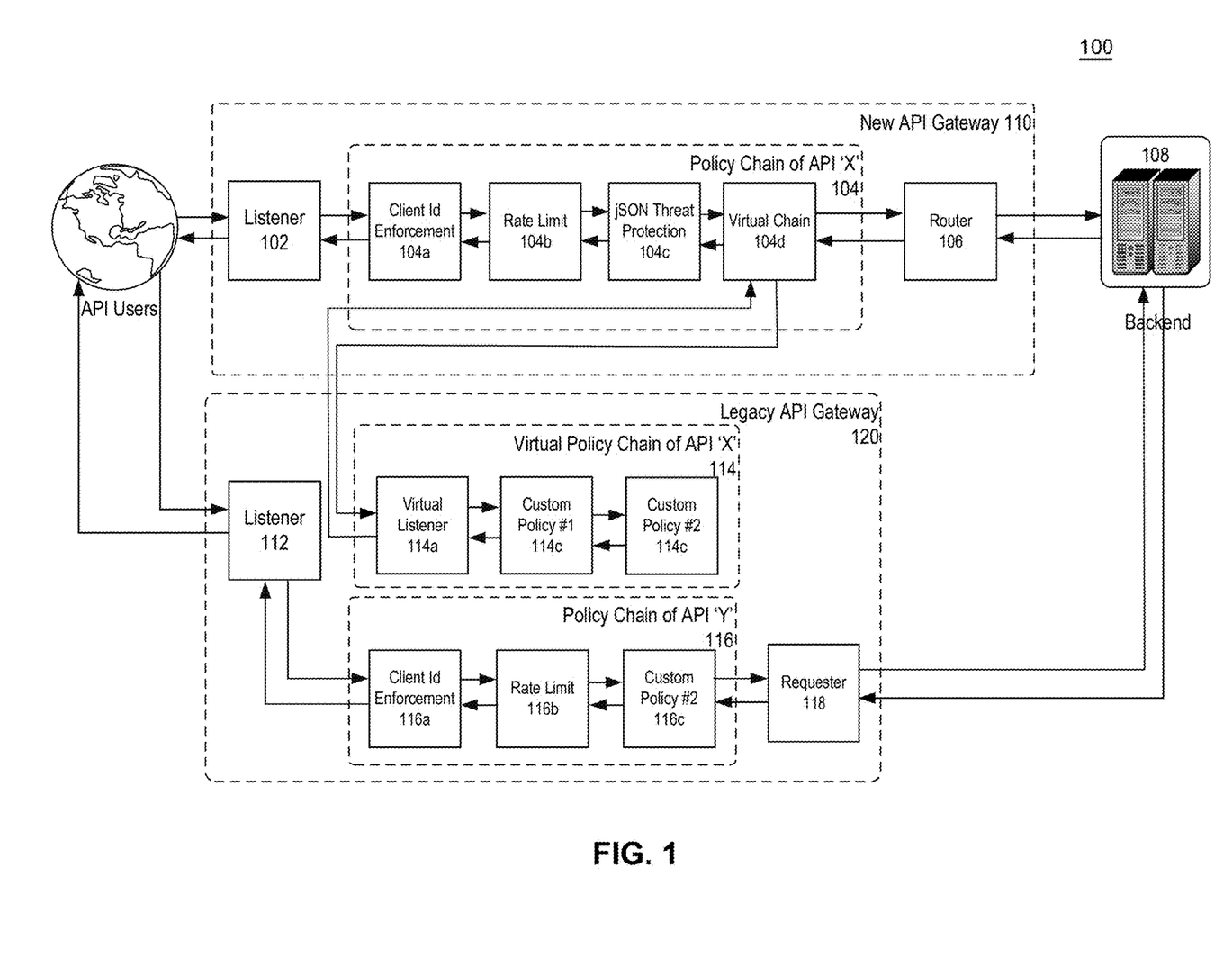
FIG. 1 illustrates a block diagram of an exemplary environment 100 for implementing an exemplary virtual policy chain to enable self-paced migration of API policies, in accordance with some embodiments.

FIG. 1 illustrates a block diagram of an exemplary environment 100 for implementing an exemplary virtual policy chain to enable self-paced migration of API policies, in accordance with some embodiments. As illustrated in FIG. 1, environment 100 may include legacy API gateway 120 implementing one or more policy chains corresponding to one or APIs. Further, environment 100 can include new API gateway 110 implementing one or more policy chains corresponding to one or APIs. In accordance with an embodiment, legacy API gateway may be a Mule API gateway and the new API gateway 120 is a Flex API gateway and the policies corresponding to one or more APIs are to be migrated from Mule API gateway to Flex API gateway.

In accordance with an embodiment, a Mule API gateway may be an extension of a Mule Runtime engine on top of Java JVM. The new API gateway may be built on top of Envoy, using Go, Rust, and C++ as extension languages. Functionally, a new API gateway and a legacy Mule API gateway may provide common functionality. This functionality includes abstracting endpoints into APIs and providing gateway capabilities over them, executing out-of-the-box policies, and the ability to extend the out-of-the-box policy suite with custom policies defined by the customer. In some embodiment, custom policies may be defined by a customer via a set of well-defined components given by a policy development kit. However, new gateway may also include new capabilities, such as new policies, lower memory footprint, and higher throughput.

In some embodiments, new API gateway 110 may implement one or more policy chains corresponding to one or more APIs. Similarly, legacy API gateway 120 may implement one or more policy chains corresponding to one or more APIs. A policy chain is a sequence of policies that may be executed on an incoming API request being forwarded from an API user to a backend. Similarly, the set of policies comprising a policy chain may also be applied on an outgoing API response that is being forwarded from a backend to an API user.

In accordance with an embodiment, new API gateway 110 may support multiple out-of-the-box policies corresponding to an API X. Similarly, legacy API gateway 120 may also support multiple out-of-the-box policies as well as one or more custom policies corresponding to API X. In some embodiments, new API gateway 110 and/or "legacy API" gateway 120 may implement a synchronization algorithm. Based on a received API request, the synchronization may identify a set of policies, corresponding to the API request, that are available at new API gateway 110. Further, based on the received API request, the synchronization protocol may identify a set of policies, corresponding to the API request, that are yet to be migrated from legacy API gateway 120 to new API gateway 110

New API gateway 110 may include a listener 102 that acts as an interface between API users and the API gateway. In some embodiments, listener 102 may receive an API request from a user and map the API request to one of the APIs supported by new API gateway 110.

In accordance with an embodiment, a synchronization algorithm may communicate with new API gateway 110 and Legacy API gateway 120 to identify the functionalities available at each gateway. Functionalities that are available at both new API gateway 110 and legacy API gateway 120 may run only at the new API gateway 110. However, functionalities that are yet to be migrated from legacy API gateway 120 to new API gateway 110 may continue to run at legacy API gateway 120.

In this example, listener 102 may receive an API request corresponding to API X. New API gateway 110 may apply a policy chain of API X 104 to the API request. Policy chain of API X 104 may comprise policies that are identified by the synchronization algorithm as policies corresponding to API X that are available at the new API gateway 110. Policy chain of API X 104 may include client ID enforcement policy 104*a*, rate-limiting policy 104*b*, and JSON threat protection policy 104*c*. In some embodiments, policy chain of API X 104 may include out-of-the-box policies that are preconfigured at new API gateway 110. In some embodiments, a client ID enforcement policy 104*a* may validate a client before accessing backend 108. In some embodiments, rate-limiting policy 104*b* may limit the number of times a user may send a request to an API within a specific time period in order to mitigate denial of service attacks. In some embodiments, JSON threat protection policy may validate the structure of a payload of an API request and may apply an authentication policy.

In this example, listener 112 at legacy API gateway 120 may receive an API request corresponding to API Y because the policies corresponding to API Y have not been migrated to new API gateway. Hence, legacy API gateway 120 may apply policy chain of API Y 116 on the API request. The policy chain of API Y 120 may comprise out-of-the-box policies as well as custom policies. Further, legacy API gateway may apply a custom policy as part of policy chains corresponding to multiple APIs. Policy chain of API Y 116 may include client ID enforcement policy 116*a*, rate-limiting policy 116*b*, and custom policy #2 116*c*. The API request may then be forward for Mule gateway 120 to backend 108 via requester 118 which acts as an interface between the API gateway and the backend API 108.

Virtual policy chain of API X 114 may be created at legacy API gateway 120 in response to receiving an API request corresponding to API X at new API gateway 110. Virtual policy chain of API X 114 may comprise one or more policies, identified by the synchronization algorithm as corresponding to the API X that are yet to be migrated from legacy API gateway 120 to new API gateway 110. Virtual policy chain of API X 114 includes a virtual listener 114*a* that may act as an interface between policy chain of API X 104 and virtual policy chain of API X 114. Further, virtual policy chain of API X 114 comprises custom policy #1 114*b* and custom policy #2 114*c*, which are custom policies that are yet to be migrated from legacy API gateway 120 to new API gateway 110.

In accordance with an embodiment, in response to receiving an API request corresponding to API X at new API gateway 110, policy chain of API X 104 may be applied to the API request. Virtual chain 104*d* may forward the API request to legacy API gateway 120 and virtual policy chain of API X 114 is applied to the API request. The API request may then be forwarded back to virtual chain 104*d* of policy chain of API X 104. Subsequently, router 106 may forward the API request to backend API 108.

In accordance with an embodiment, an API response corresponding to the API request may be received from backend API 108 at router 106 for new API gateway 110. The API response is forwarded to legacy API gateway 120 via virtual chain 104*d*. Virtual policy chain of API X 114 is applied to the API response and forwarded back to new API gateway 110. Subsequently, the API response is forwarded to the user after applying policy chain of API X 104.

According to some embodiments, during startup, legacy API gateway 120 may be started in a support mode which then spools new API gateway 110 before it. According to some embodiments, legacy API gateway 120 may start the new API gateway that references legacy API gateway 120 as its virtual policy chain. Further, an initial execution port defined for legacy API gateway 120 may be modified to belong to new API gateway 110 so that every request will go through new API gateway 110.

Figure 2:
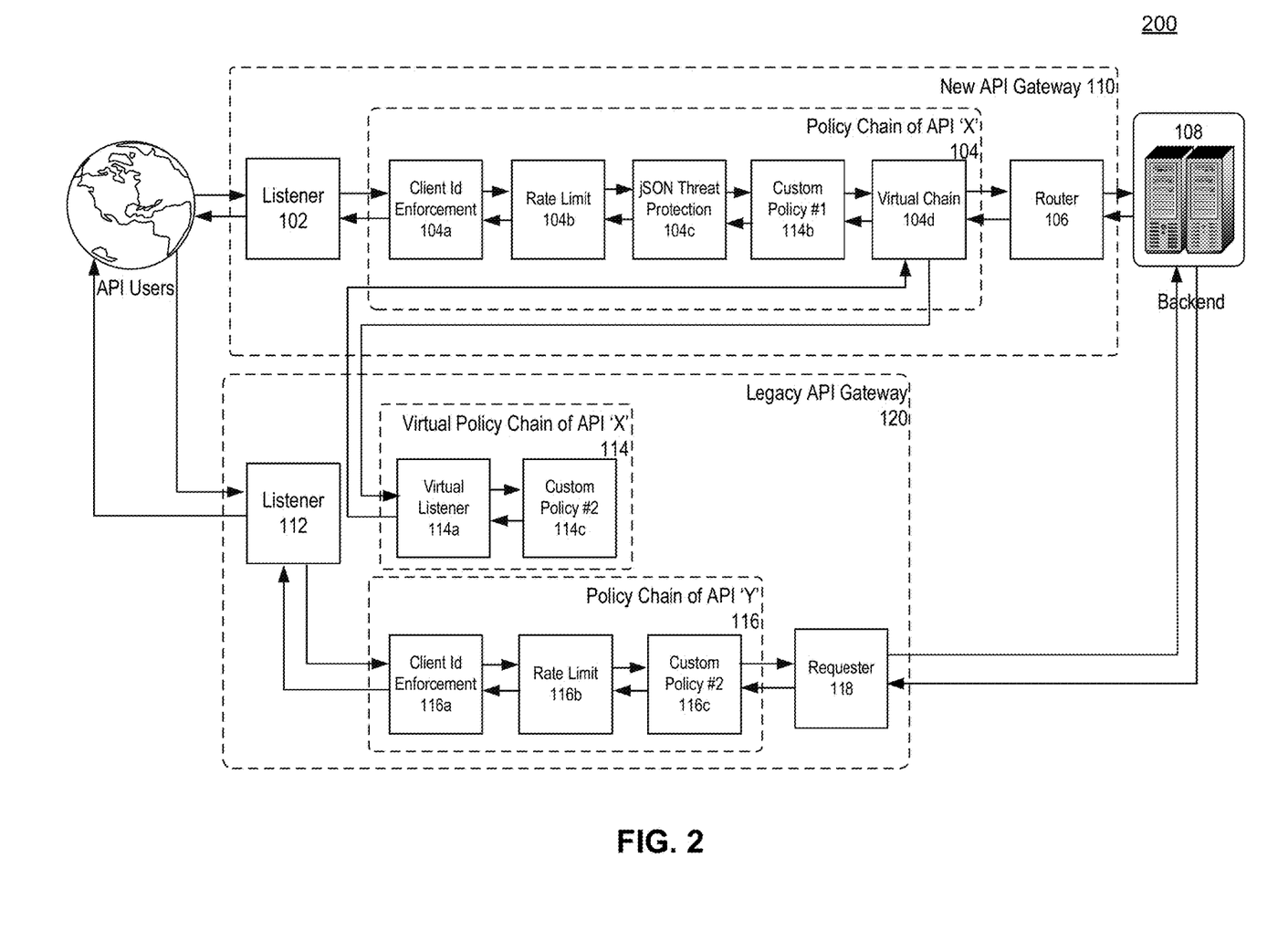
FIG. 2 illustrates a block diagram of an exemplary environment 100 for implementing an exemplary virtual policy chain in which a policy has been migrated, in accordance with some embodiments.

FIG. 2 illustrates a block diagram of an exemplary environment 100 for implementing an exemplary virtual policy chain in which a policy has been migrated, in accordance with some embodiments. For ease of explanation, FIG. 2 may be described with reference to elements from FIG. 1. In accordance with an embodiment, custom policy #1 114*b* may be completely migrated from legacy API gateway 120 to new API gateway 110. According to an embodiment, listener 102 at new API gateway 110 may receive an API request corresponding to API X. A synchronization algorithm may then communicate with new API gateway 110 and legacy API gateway 120 to identify the functionalities available at each gateway. Functionalities that are available at both new API gateway 110 and legacy API gateway 120 may run only at the new API gateway 110. For example, since custom policy #1 114*b* has been completely migrated to new API gateway 110, it may be implemented as part policy chain of API X 104. Functionalities that are yet to be migrated from legacy API gateway 120 to new API gateway 110 may continue to run at legacy API gateway 120. For example, custom policy #2 114*c* has not been migrated yet and may be implemented as part of virtual policy chain of API X 114 at legacy API gateway 120. According to some embodiments, when none of the policies at legacy API gateway 120 function as a virtual chain of new API gateway 110, legacy API gateway 120 may be configured to shut down by itself to minimize infrastructure maintenance.

Figure 3:
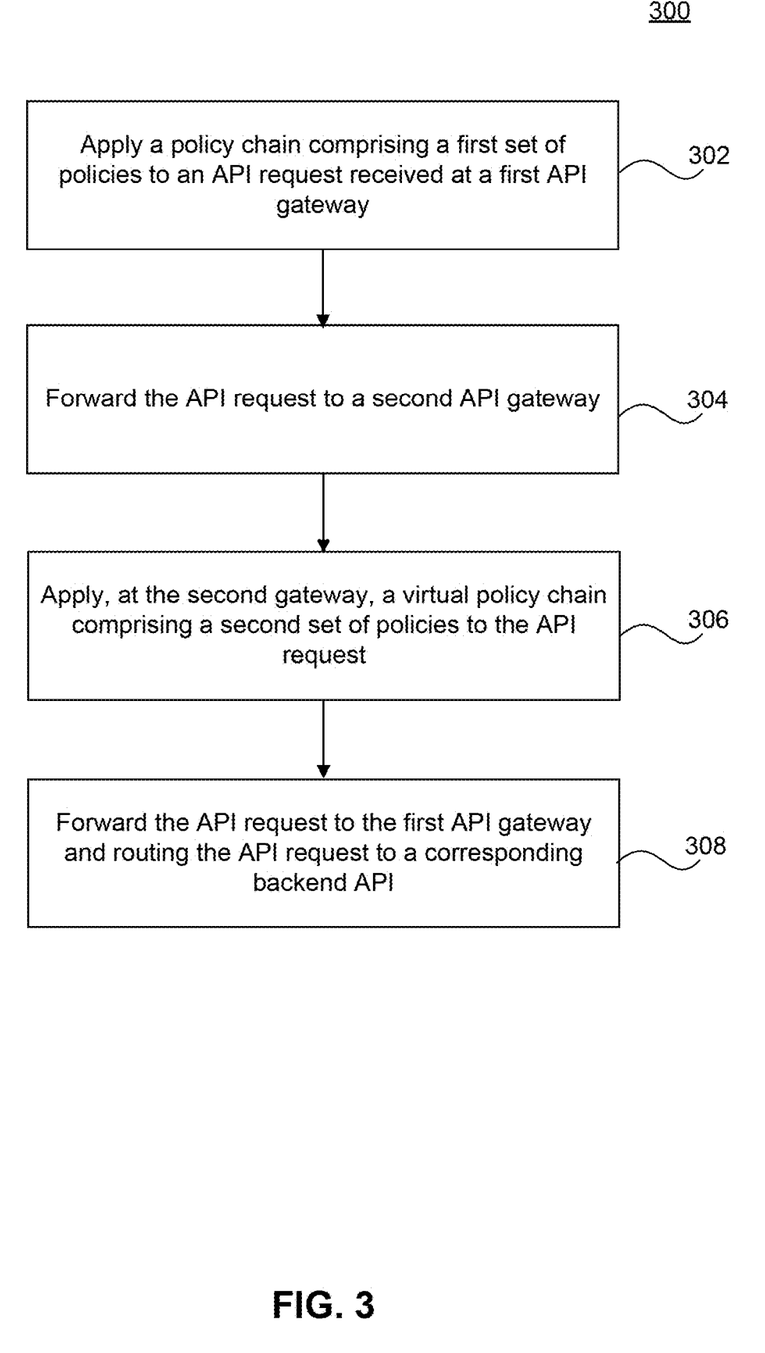
FIG. 3 illustrates a flowchart diagram of an exemplary method for implementing API gateway self-paced migration, according to some embodiments.

FIG. 3 is a flowchart for method 300 for implementing API self-paced migration, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1 and 2. However, method 300 is not limited to those example embodiments.

In step 302, an API request is received at new API gateway 110 and policy chain of API X 104 comprising a set of policies is applied to the received API request. According to some embodiments, a synchronization protocol in communication with new API gateway 110 and legacy API gateway 120 may determine the policies that may be implemented as part of policy chain of API X 104. According to some embodiments, the latest policies as well as policies that are available both at new API gateway 110 and legacy API gateway 120 may be implemented at new API gateway 110. According to some embodiments, an initial execution port defined for legacy API gateway 120 may be modified to belong to new API gateway 110, and all subsequent API requests may go through new API gateway 110.

In step 304, the API request is forwarded from new API gateway 110 to legacy API gateway 120 after applying policy chain of API X 104 at new API gateway 110. Policies that are yet to be migrated from legacy API gateway to new API gateway 110 may be implemented at legacy API gateway 120.

In step 306, at legacy API gateway 120, a virtual policy chain of API X 114 comprising a set of policies is applied to the API request. According to some embodiments, a synchronization protocol in communication with new API gateway 110 and legacy API gateway 120 may determine the policies that may be implemented as part of virtual policy chain of API X 114. According to some embodiments, policies corresponding to API X that are not available at new API gateway 110 and policies that are yet to be migrated from legacy API gateway 120 to new API gateway 110 may be implemented at new API gateway 110.

In step 308, the API request is forwarded from legacy API gateway 120 to new API gateway 110 after applying virtual policy chain of API X. Router 106, which may act as an interface between the new API gateway 110 and backend 108, may forward the API request to backend 108. Further, according to some embodiments, new API gateway 110 may be an envoy based API gateway and legacy API gateway 120 may be a Java based API gateway.

Figure 4:
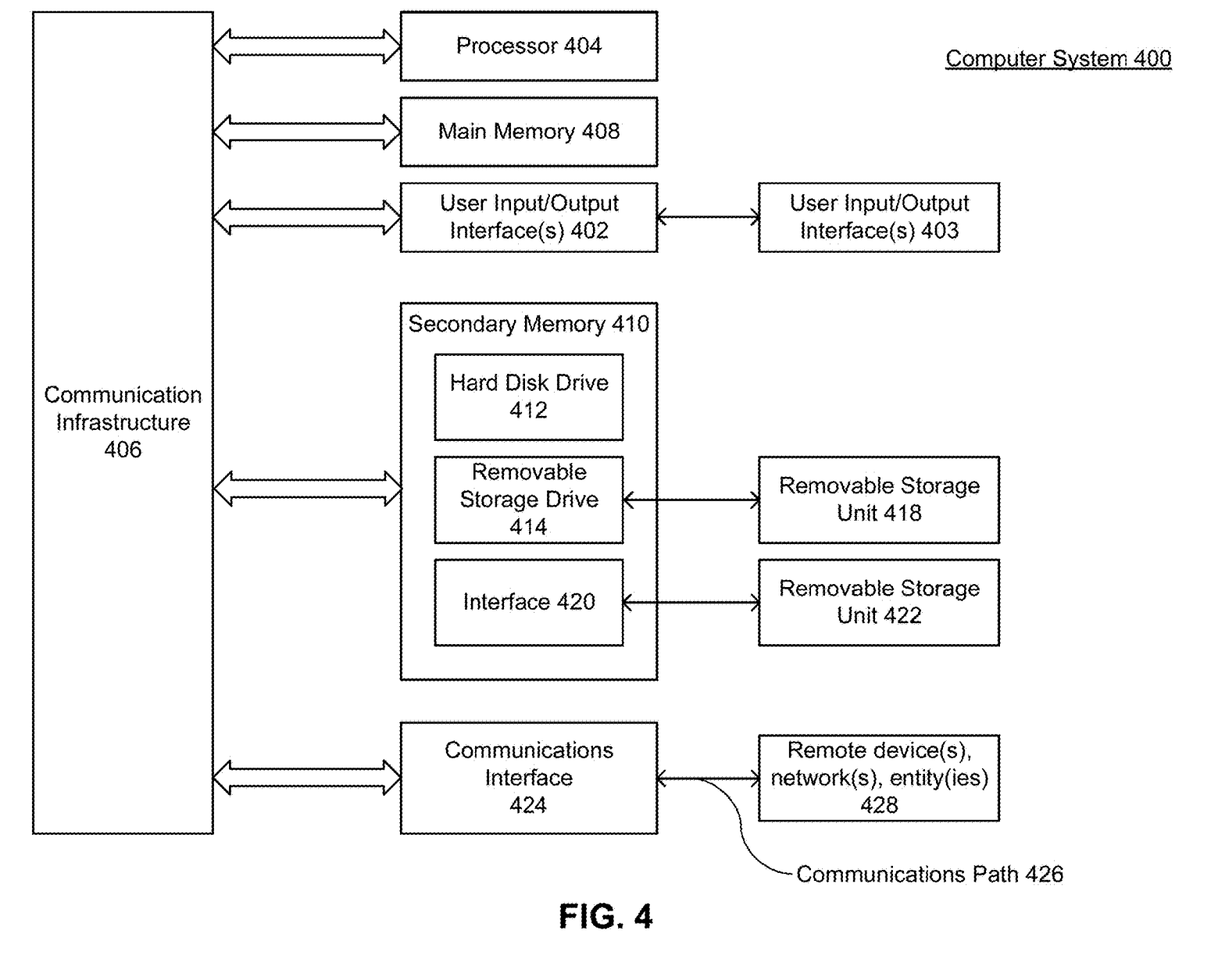
FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for self-paced migration of an Application Programming Language (API) gateway, comprising:
    applying a policy chain comprising a first set of policies to an API request received at a first API gateway;
    forwarding the API request to a second API gateway;
    applying, at the second API gateway, a virtual policy chain comprising a second set of policies to the API request;
    forwarding the API request from the second API gateway to the first API gateway and routing the API request to a corresponding backend API.

2. The method of claim 1, wherein the second set of policies comprises a one or more policies corresponding to the API request that are yet to be migrated from the second API gateway to the first API gateway.

3. The method of claim 1, further comprising:
    identifying, by a synchronization protocol, in communication with the first API gateway and the second API gateway, the second set of policies.

4. The method of claim 1, wherein the second set of policies comprises one or more custom policies.

5. The method of claim 1, wherein the first API gateway is an envoy based API gateway.

6. The method of claim 1, wherein the second API gateway is a Java based API gateway.

7. The method of claim 1, further comprising:
    receiving, at the first API gateway, an API response from the backend API;
    forwarding the API response from the first API gateway to the second API gateway; and
    applying the virtual policy chain to the API request; and
    forwarding the API response to the first API gateway.

8. A system, comprising:
    a memory; and
    at least one processor coupled to the memory and configured to:
        apply a policy chain comprising a first set of policies to an API request received at a first API gateway;
        forward the API request to a second API gateway;
        apply, at the second API gateway, a virtual policy chain comprising a second set of policies to the API request;
        forward the API request from the second API gateway to the first API gateway and routing the API request to a corresponding backend API.

9. The system of claim 8, wherein the second set of policies comprises one or more policies corresponding to the API request that are yet to be migrated from the second API gateway to the first API gateway.

10. The system of claim 8, wherein the at least one processor is further configured to:
identify, by a synchronization protocol, in communication with the first API gateway and the second API gateway, the second set of policies.

11. The system of claim 8, wherein the second set of policies comprises one or more custom policies.

12. The system of claim 8, wherein the first API gateway is an envoy based API gateway.

13. The system of claim 8, wherein the second API gateway is a Java based API gateway.

14. The system of claim 8, wherein the at least one processor is further configured to:
receiving, at the first API gateway, an API response from the backend API;
forwarding the API response from the first API gateway to the second API gateway; and
applying the virtual policy chain to the API request and forwarding the API response to the first API gateway.

15. A non-transitory computer-readable medium (CRM) having instructions stored thereon that, when executed by at least one computing device, causes the at least one computing device to perform operations comprising:
applying a policy chain comprising a first set of policies to an API request received at a first API gateway;
forwarding the API request to a second API gateway;
applying, at the second API gateway, a virtual policy chain comprising a second set of policies to the API request;
forwarding the API request from the second API gateway to the first API gateway and routing the API request to a corresponding backend API.

16. The non-transitory CRM of claim 15, wherein the second set of policies comprises one or more policies corresponding to the API request that are yet to be migrated from the second API gateway to the first API gateway.

17. The non-transitory CRM of claim 15, the operations further comprising:
identifying, by a synchronization protocol, in communication with the first API gateway and the second API gateway, the second set of policies.

18. The non-transitory CRM of claim 15, wherein the second set of policies comprises one or more custom policies.

19. The non-transitory CRM of claim 15, wherein the first API gateway is an envoy based API gateway.

20. The non-transitory CRM of claim 15, wherein the second API gateway is a Java based API gateway.

* * * * *